(12) United States Patent
Shen

(10) Patent No.: US 10,841,118 B2
(45) Date of Patent: Nov. 17, 2020

(54) AUTOMATIC PAIRING METHOD AND SERVER

(71) Applicant: Sercomm Corporation, Taipei (TW)

(72) Inventor: Yu-Li Shen, Taipei (TW)

(73) Assignee: SERCOMM CORPORATION, Taipei (TW)

( * ) Notice: Subject to any disclaimer, the term of this patent is extended or adjusted under 35 U.S.C. 154(b) by 166 days.

(21) Appl. No.: 15/722,389

(22) Filed: Oct. 2, 2017

(65) Prior Publication Data

US 2018/0132290 A1 May 10, 2018

(30) Foreign Application Priority Data

Nov. 9, 2016 (CN) .......................... 2016 1 0994833

(51) Int. Cl.
*H04L 12/28* (2006.01)
*H04W 12/04* (2009.01)
(Continued)

(52) U.S. Cl.
CPC ...... *H04L 12/2809* (2013.01); *H04L 12/2829* (2013.01); *H04L 63/061* (2013.01); *H04L 63/102* (2013.01); *H04L 67/04* (2013.01); *H04L 67/306* (2013.01); *H04W 4/80* (2018.02); *H04W 8/20* (2013.01); *H04W 8/205* (2013.01); *H04W 12/04* (2013.01); *H04W 12/0804* (2019.01);
(Continued)

(58) Field of Classification Search
CPC ....... H04W 76/16; H04W 8/20; H04W 12/08; H04W 12/04; H04W 4/80; H04W 8/205; H04L 12/2829; H04L 12/2809; H04L 63/102; H04L 63/061; H04L 67/04; H04L 67/306; H04L 2012/2841; H04L 12/2832

See application file for complete search history.

(56) References Cited

U.S. PATENT DOCUMENTS 7,912,020 B2   3/2011   Khasawneh et al.
8,989,706 B2   3/2015   Ananthanarayanan et al.
(Continued)

FOREIGN PATENT DOCUMENTS

CN    1387130 A      12/2002
CN    101013483 A    8/2007
(Continued)

OTHER PUBLICATIONS

Chinese Office Action dated Jan. 3, 2019, issued in application No. CN 201610994833.3.
(Continued)

*Primary Examiner* — Michael A Keller
(74) *Attorney, Agent, or Firm* — McClure, Qualey & Rodack, LLP

(57) ABSTRACT

An automatic pairing method and a server are provided. The automatic pairing method is performed by the server for automatically pairing a first device with a second device. The automatic pairing method includes following steps. A user account associated with the first device is stored. An association request for associating the second device with the user account is received. A first security configuration parameter of the first device is transmitted to the second device. A second security configuration parameter of the second device is transmitted to the first device.

11 Claims, 4 Drawing Sheets

(51) Int. Cl.
  *H04L 29/06* (2006.01)
  *H04W 8/20* (2009.01)
  *H04W 12/08* (2009.01)
  *H04W 4/80* (2018.01)
  *H04W 76/16* (2018.01)
  *H04L 29/08* (2006.01)

(52) U.S. Cl.
  CPC ......... *H04W 76/16* (2018.02); *H04L 12/2832* (2013.01); *H04L 2012/2841* (2013.01)

(56) References Cited

U.S. PATENT DOCUMENTS

| | | | |
|---|---|---|---|
| 9,009,525 B1* | 4/2015 | Murphy | H04L 9/16 713/193 |
| 9,100,943 B2 | 8/2015 | Sinha et al. | |
| 9,202,042 B2 | 12/2015 | Martinez et al. | |
| 9,210,357 B1 | 12/2015 | Dong et al. | |
| 9,369,606 B2 | 6/2016 | Tredoux | |
| 9,374,656 B2 | 6/2016 | Reitz | |
| 9,426,607 B2 | 8/2016 | Shelly et al. | |
| 9,451,649 B2 | 9/2016 | Sinha et al. | |
| 2006/0250980 A1 | 11/2006 | Pereira et al. | |
| 2008/0057868 A1 | 3/2008 | Chang | |
| 2008/0057890 A1 | 3/2008 | McKillop et al. | |
| 2008/0076389 A1 | 3/2008 | Lee et al. | |
| 2008/0102793 A1 | 5/2008 | Ananthanarayanan et al. | |
| 2008/0161050 A1 | 7/2008 | Shudark et al. | |
| 2008/0305741 A1 | 12/2008 | Fornell et al. | |
| 2009/0319673 A1 | 12/2009 | Peters | |
| 2011/0273625 A1* | 11/2011 | McMahon | H04N 21/4126 348/734 |
| 2012/0322376 A1* | 12/2012 | Couse | H04M 1/7253 455/41.2 |
| 2014/0143137 A1 | 5/2014 | Carlson | |
| 2014/0162586 A1 | 6/2014 | Cech | |
| 2014/0179228 A1 | 6/2014 | Maffetone | |
| 2014/0189840 A1 | 7/2014 | Metke et al. | |
| 2014/0266634 A1 | 9/2014 | Castillo et al. | |
| 2014/0273844 A1 | 9/2014 | Castillo et al. | |
| 2015/0019280 A1 | 1/2015 | Mejegård et al. | |
| 2015/0024688 A1 | 1/2015 | Hrabak et al. | |
| 2015/0026047 A1 | 1/2015 | Johnson | |
| 2015/0097689 A1 | 4/2015 | Logue et al. | |
| 2015/0105014 A1 | 7/2015 | Johnson | |
| 2015/0213432 A1 | 7/2015 | Johnson | |
| 2015/0215292 A1 | 7/2015 | Novicov | |
| 2015/0289085 A1 | 10/2015 | Shelly | |
| 2015/0312240 A1 | 10/2015 | Fu | |
| 2016/0057008 A1 | 2/2016 | Liu | |
| 2016/0095145 A1 | 3/2016 | Gupta et al. | |
| 2016/0112411 A1 | 4/2016 | Shy | |
| 2016/0196740 A1 | 7/2016 | Park | |
| 2016/0241605 A1 | 8/2016 | Taboriskiy et al. | |
| 2016/0309323 A1 | 10/2016 | Zarakas et al. | |
| 2016/0317767 A1 | 11/2016 | Shelly et al. | |
| 2016/0337496 A1 | 11/2016 | Jeganathan et al. | |
| 2017/0012961 A1 | 1/2017 | White et al. | |
| 2017/0013659 A1 | 1/2017 | Sinha et al. | |
| 2017/0091426 A1* | 3/2017 | Johnson | G06F 19/36 |
| 2017/0091745 A1* | 3/2017 | Castinado | G06Q 20/4014 |
| 2017/0118645 A1 | 4/2017 | Zarakas et al. | |
| 2017/0134556 A1 | 5/2017 | Webster et al. | |
| 2017/0200144 A1 | 7/2017 | Chatterton | |
| 2017/0202040 A1 | 7/2017 | Chatterton | |
| 2017/0220490 A1 | 8/2017 | Tan et al. | |

FOREIGN PATENT DOCUMENTS

| | | |
|---|---|---|
| CN | 101390300 A | 3/2009 |
| CN | 201263145 Y | 6/2009 |
| CN | 201336662 Y | 10/2009 |
| CN | 101785198 A | 7/2010 |
| CN | 101930507 A | 12/2010 |
| CN | 102014193 A | 4/2011 |
| CN | 102149167 A | 8/2011 |
| CN | 102315654 A | 1/2012 |
| CN | 102449989 A | 5/2012 |
| CN | 102594988 A | 7/2012 |
| CN | 102857267 A | 1/2013 |
| CN | 102917113 A | 2/2013 |
| CN | 101785198 B | 4/2013 |
| CN | 103136928 A | 6/2013 |
| CN | 103617578 A | 3/2014 |
| CN | 203483414 U | 3/2014 |
| CN | 103957677 A | 7/2014 |
| CN | 103997366 A | 8/2014 |
| CN | 104284025 A | 1/2015 |
| CN | 104521260 A | 4/2015 |
| CN | 104540091 A | 4/2015 |
| CN | 104754469 A | 7/2015 |
| CN | 104871574 A | 8/2015 |
| CN | 104919437 A | 9/2015 |
| CN | 104954830 A | 9/2015 |
| CN | 104980882 A | 10/2015 |
| CN | 204707244 U | 10/2015 |
| CN | 105025477 A | 11/2015 |
| CN | 105101467 A | 11/2015 |
| CN | 105208515 A | 12/2015 |
| CN | 105262516 A | 1/2016 |
| CN | 103150595 A | 3/2016 |
| CN | 105501006 A | 4/2016 |
| CN | 105611649 A | 5/2016 |
| CN | 205407819 U | 7/2016 |
| CN | 105933987 A | 9/2016 |
| CN | 205584257 U | 9/2016 |
| CN | 103795444 B | 11/2016 |
| CN | 106100844 A | 11/2016 |
| CN | 106407857 A | 2/2017 |
| CN | 106416332 A | 2/2017 |
| CN | 106502113 A | 3/2017 |
| CN | 106771827 A | 5/2017 |
| CN | 104579428 B | 6/2017 |
| CN | 206224634 U | 6/2017 |
| CN | 103702396 B | 7/2017 |
| CN | 107046674 A | 8/2017 |
| CN | 107079256 A | 8/2017 |

OTHER PUBLICATIONS

Chinese Office Action dated Jul. 26, 2019 in corresponding CN application (No. 201610994833.3).

* cited by examiner

AUTOMATIC PAIRING METHOD AND SERVER

This application claims the benefit of People's Republic of China application Serial No. 201610994833.3, filed Nov. 9, 2016, the disclosure of which is incorporated by reference herein in its entirety.

TECHNICAL FIELD

The disclosure relates in general to an automatic pairing method, and more particularly to an automatic pairing method performed by a server for automatically pairing multiple devices.

BACKGROUND

Along with the rapid advance in technology, the smart home application has gained great popularity. A smart home system may include multiple smart home devices, such as a door/window sensor, a temperature sensor, an Internet Protocol (IP) camera, a curtain controller, an illumination controller, and a smart plug, etc. The user can control the smart home devices through a mobile phone, a tablet computer, a personal computer, or a voice-controlled device such as Amazon Echo. As the products of the smart home devices become more diversified, how to effectively manage multiple smart home devices has become a prominent task for the industries.

SUMMARY

The disclosure is directed to an automatic pairing method and a server for collaborating multiple devices through the automatic pairing method performed by the server.

According to one embodiment, an automatic pairing method performed by a server for automatically pairing a first device with a second device is provided. The automatic pairing method includes following steps. A user account associated with the first device is stored. An association request for associating the second device with the user account is received. A first security configuration parameter of the first device is transmitted to the second device. A second security configuration parameter of the second device is transmitted to the first device.

According to another embodiment of the invention, a server for automatically pairing a first device with a second device is provided. The server includes a memory and a communication circuit. The memory stores a user account associated with the first device. The communication circuit is electrically coupled to the memory for receiving an association request for associating the second device with the user account. The communication circuit further transmits a first security configuration parameter of the first device to the second device and a second security configuration parameter of the second device to the first device.

The above and other aspects of the invention will become better understood with regard to the following detailed description of the preferred but non-limiting embodiment(s). The following description is made with reference to the accompanying drawings.

DETAILED DESCRIPTION

Cyber security is always a crucial issue to the application field of smart home technology. In the example of controlling the smart home devices using a mobile phone, the user can pair the mobile phone with the smart home devices using the application programs installed in the mobile phone to ensure cyber security and avoid unauthorized controlling of the smart home devices or stealing data. In this disclosure, pairing means associating two devices so that they could communicate with each other afterward. After two devices are paired, one device would be able to check the status and/or control the operation of the other device under normal circumstances. In this disclosure, pairing could also mean associating a device with a user account so that with the user account, one would be able to check the status and/or control the operation of the paired device under normal circumstances.

In an exemplary scenario of use, the user firstly purchases a first smart home device such as an IP camera. After the user pairs the IP camera with a mobile phone, the user will be able to login a user account to control the IP camera. After a period of time, the user may purchase a second smart home device such as a door/window sensor. If the door/window sensor and the IP camera do not belong to the same product kit, it would be difficult for the user to pair the door/window sensor and the IP camera. Without being paired together, the door/window sensor and the IP camera would not be able to collaborate with each other automatically.

The invention provides an automatic pairing method for pairing a first device with a second device. Each of the first device and the second device could be a smart home device such as a door/window sensor, a smoke sensor, a temperature sensor, a water sensor, an infra-red sensor, a safety monitoring sensor, a home control sensor, an energy management sensor, a IP camera, a curtain controller, an illumination controller, a smart plug, a smart alarm, a voice-controlled device such as Amazon Echo, or a home gateway. In the exemplified scenario of use, the automatic pairing method can automatically pair the newly procured second smart home device with the previously procured first smart home device. Details of the method are disclosed below.

Figure 1:
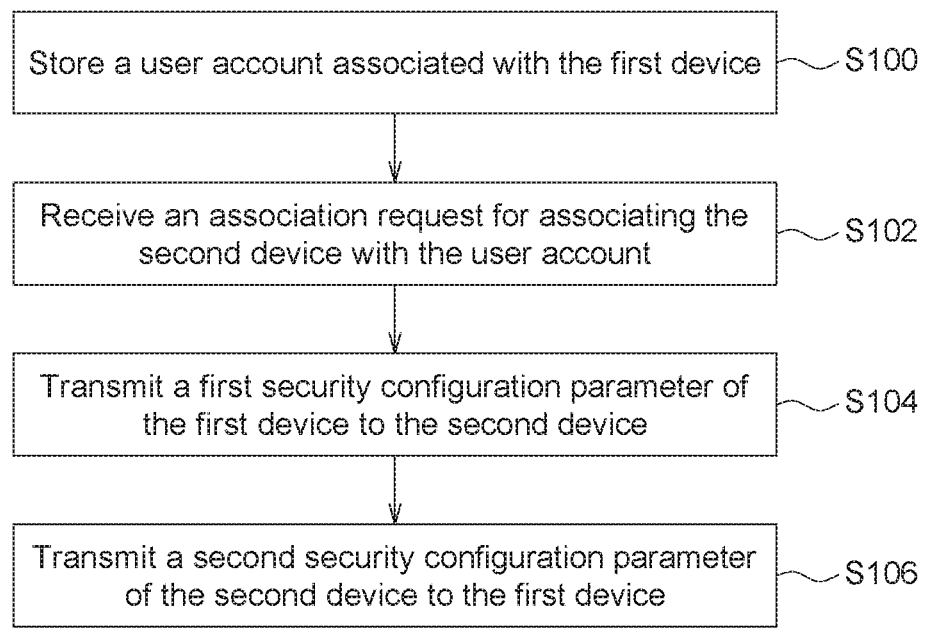
FIG. 1 is a flowchart of an automatic pairing method according to an embodiment of the invention.

FIG. 1 is a flowchart of an automatic pairing method according to an embodiment of the invention. The automatic pairing method, which can be performed by a server, includes following steps. In step S100, a user account associated with a first device is stored. In step S102, an association request for associating a second device with the user account is received. In step S104, a first security configuration parameter of the first device is transmitted to the second device. In step S106, a second security configuration parameter of the second device is transmitted to the first device.

Figure 2:
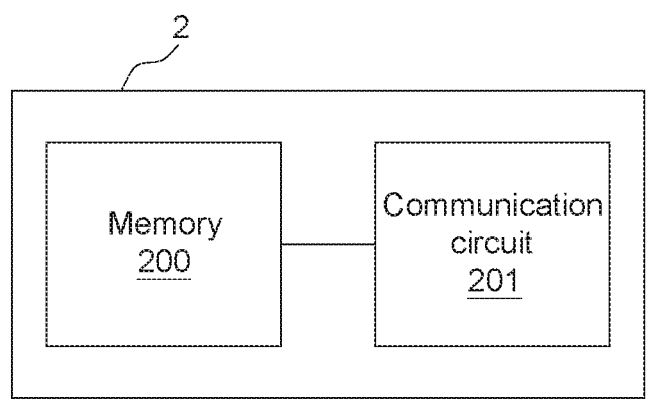
FIG. 2 is a schematic diagram of a server according to an embodiment of the invention.
Figure 3:
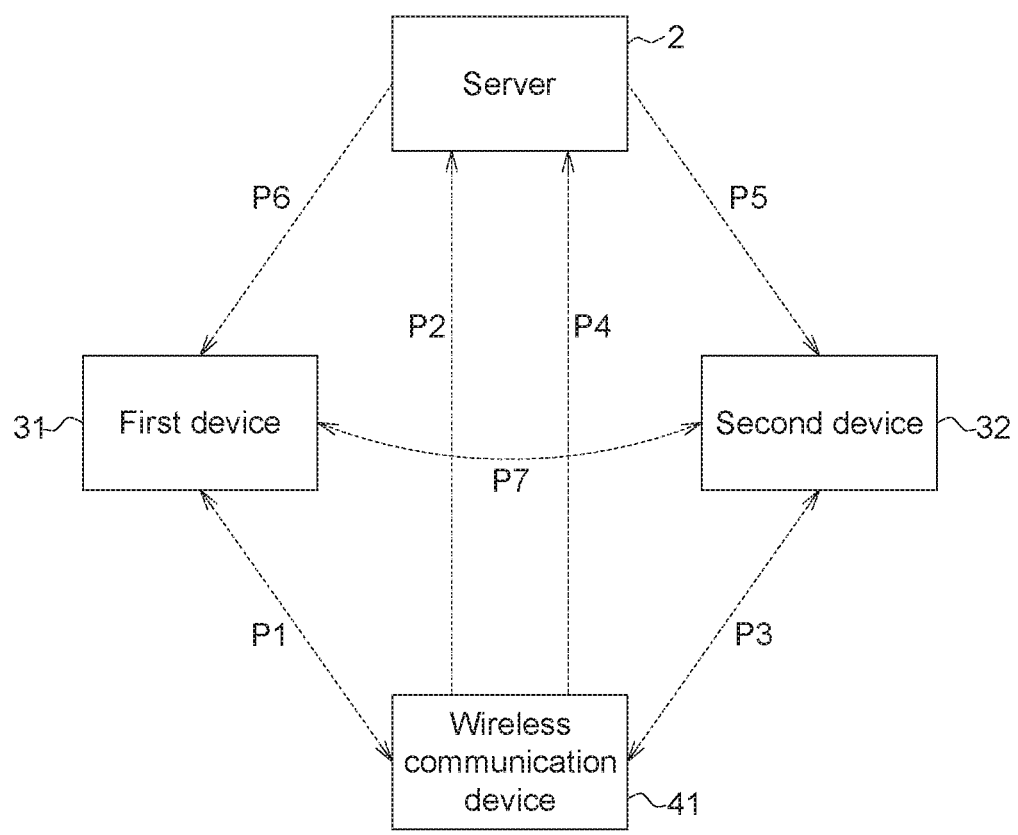
FIG. 3 is a schematic diagram of the steps of an automatic pairing method according to an embodiment of the invention.

The automatic pairing method is described with FIG. 2 and FIG. 3. FIG. 2 is a schematic diagram of a server according to an embodiment of the invention. The server 2 includes a memory 200 and a communication circuit 201. The memory 200 stores the user account associating with the first device 31. The communication circuit 201 is electrically coupled to the memory 200. The communication circuit 201 is for receiving an association request for associating the second device 32 with the user account. The communication circuit 201 further transmits a first security configuration parameter of the first device 31 to the second device 32, and transmits a second security configuration parameter of the second device 32 to the first device 31. The memory 200 can be realized by such as a random access memory or a non-volatile memory. The memory 200 stores data. The communication circuit 201 can be realized by a circuit having data transmitting function and capable of transmitting data through a wired or wireless network. The communication circuit 201 may include a network interface card, a radio frequency circuit or an antenna. In an embodiment, the communication circuit 201 may include a micro-processor.

Refer to FIG. 1 and FIG. 2. In step S100, a user account associated with the first device 31 is stored in the memory 200 of the server 2. For example, after the first device 31 has successfully paired with a wireless communication device 41, the wireless communication device 41 informs the successful pairing message to the server 2, and the server 2 accordingly associates the first device 31 with the user account, such that the user can login the user account to control the first device 31 via the wireless communication device 41. For example, the wireless communication device 41 could be a mobile phone, a tablet computer, a desktop or laptop PC, or a voice-controlled device.

Then, when the user adds a second device 32 to the system, after the wireless communication device 41 has successfully paired with the second device 32, the wireless communication device 41 outputs an association request to the server 2. In step S102, the communication circuit 201 may receive an association request for associating the second device 32 with the same user account of the user. Meanwhile, the server 2 knows that both the first device 31 and the second device 32 are associated with the same user account. For example, a judgment is performed by a micro-processor of the communication circuit 201, so as to decide that the first device 31 and the second device 32 should be paired together automatically, in order to operate collaboratively.

In step S104, the first security configuration parameter of the first device 31 is transmitted to the second device 32 by the communication circuit 201 of the server 2. In step S106, the second security configuration parameter of the second device 32 is transmitted to the first device 31 by the communication circuit 201 of the server 2. In steps S104 and S106, the security configuration parameters can be transmitted to the first device 31 and the second device 32 from the server 2 via a wired network or a wireless network. The security configuration parameters can be transmitted via a safe connection such as a verified and/or encrypted channel. The server 2 performs steps S104 and S106 automatically, without intervention from the user or the wireless communication device 41.

The first security configuration parameter is at least one parameter of the first device 31 that allows another device to interact with the first device 31 in a secured manner. For example, the first security configuration parameter may include one or more of the following information of the first device 31: a device account access parameter (such as the account or the password used for login), a device public cryptographic key (used for encryption and decryption during data transmission), a communication protocol parameter, such as MQTT, (used for enabling secure communication with the first device 31 through the MQTT protocol securely), and a device automation rule (such as the activation condition of the first device 31). Similarly, the second security configuration parameter may include at least one of the above information of the second device 32.

Through steps S104 and S106, the first device 31 and the second device 32 in effect exchange the first security configuration parameter and the second security configuration parameter, such that the first device 31 and the second device 32 can interact with each other through a safe connection. For example, after detecting an event, the first device 31 can trigger or activate the second device 32, and vice versa. Moreover, the first device 31 and the second device 32 can operate collaboratively without using the server 2 as an intermediary.

For example, the first device 31 may be exemplified by an IP camera, and the second device 32 may be exemplified by an infra-red sensor. After the first device 31 and the second device 32 have been successfully paired, the second device 32, when detecting an abnormal event, can trigger the first device 31 to start recording video. Some other examples are disclosed below. After a smoke sensor and an alarm have been successfully paired, the smoke sensor, when detecting smoke, can activate the alarm. After a door/window sensor and a smart plug have been successfully paired, the door/window sensor, when detecting the house owner walks out of the door, can trigger the smart plug to stop supplying power to a heater or air conditioner.

In above examples, two devices are used for exemplary and explanatory purposes, but the invention is not limited thereto. When a third device or a fourth device is added to the system, the automatic pairing method of the invention still can be used. The server 2 facilitates the exchange of respective security configuration parameters of any two devices associated with the same user account, such that the devices can interact with each other automatically. The following example illustrates the collaborative operation between three smart home devices. A light sensor, when detecting a change in the indoor light, can trigger a curtain controller to change the volume of the entering sunlight or trigger an illumination controller to change the indoor illumination inside the house.

FIG. 3 is a schematic diagram of the steps of an automatic pairing method according to an embodiment of the invention. FIG. 3 illustrates an example of the timing of each step of the system. The system as indicated in FIG. 3 includes a server 2, a first device 31, a second device 32, and a wireless communication device 41. The user can control the first device 31 and the second device 32 through the wireless communication device 41.

In step P1, the wireless communication device 41 pairs with the first device 31. In step P2, the wireless communication device 41 transmits a first association request to the server 2 for associating the first device 31 with a user account. In step P3, the wireless communication device 41 pairs with the second device 32. In step P4, the wireless communication device 41 transmits a second association request to the server 2 for associating the second device 32 with the same user account. Then, the server 2 knows that the first device 31 and the second device 32 both are associated with the same user account. In step P5, the server 2 transmits the first security configuration parameter of the first device 31 to the second device 32. In step P6, the server transmits the second security configuration parameter of the second device 32 to the first device 31. The server 2 performs steps P5 and P6 automatically, without intervention from the user or the wireless communication device 41. Through steps P5 and P6, the first device 31 and the second device 32 obtain respective security configuration parameters, and hence could interact with each other automatically subsequently. In step P7, the first device 31 and the second device 32 can communicate with each other through the first security configuration parameter and the second security configuration parameter without intervention from the wireless communication device 41 or the server 2.

The wireless communication device 41 can pair with the first device 31 or the second device 32, and the first device 31 can communicate with the second device 32 via wireless technologies such as ZigBee, Z-Wave, Wi-Fi, Bluetooth, or DECT ULE.

For example, the server 2 and the wireless communication device 41 can be integrated as one single device, and the transmission in steps P2 and P4 can be omitted or done through internal communication within the single device. Besides, the server 2 can be realized by a local network server, and the server 2, the first device 31 and the second device 32 are within the same local network. The server 2 can be realized by a cloud server, which can be connected to the first device 31 and the second device 32 through the Internet. Let the server 2 be exemplified by a cloud server. After a safe connection between the first device 31 and the second device 32 is established through the first security configuration parameter and the second security configuration parameter, the first device 31 and the second device 32 can operate collaboratively without using the server 2 as an intermediary. That is, the first device 31 and the second device 32 can communicate with each other through a local network (such as ZigBee, Z-Wave, Wi-Fi, Bluetooth, or DECT ULE network) instead of the Internet. Thus, the first device 31 and the second device 32 can operate collaboratively without going through the Internet or the cloud. As a result, even when the Internet connection is interrupted, the video recording function of the IP camera still can be successfully activated through the collaborative operation between the IP camera and a door/window sensor or a PIR sensor. The collaborative operation between the smart home devices without using the Internet really enhances the convenience and security of use.

Figure 4:
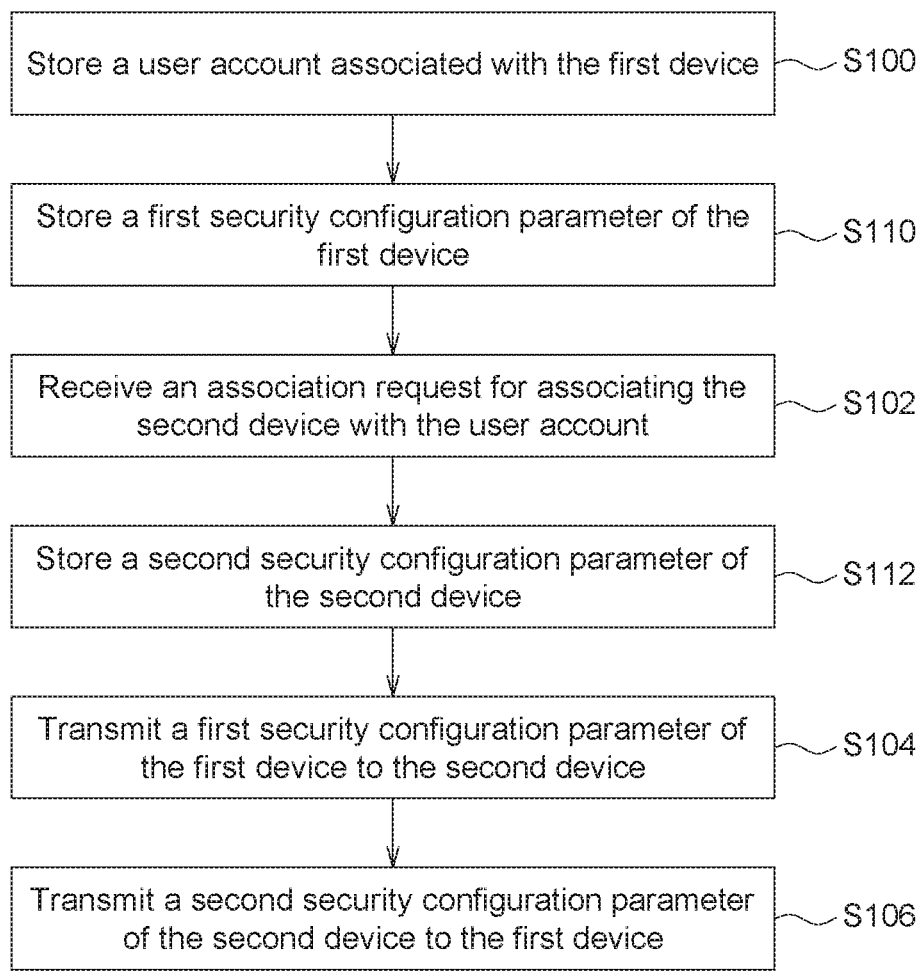
FIG. 4 is a flowchart of an automatic pairing method using stored security configuration parameters according to an embodiment of the invention.

The server 2 needs to have the first security configuration parameter and the second security configuration parameter before performing the steps S104 and S106 of FIG. 1. In an embodiment, after the first device 31 is paired with the user account, the first security configuration parameter of the first device 31 is stored in the server 2. FIG. 4 is a flowchart of an automatic pairing method using stored security configuration parameters according to an embodiment of the invention. In comparison to the method as indicated in the flowchart of FIG. 1, the automatic pairing method of the present embodiment further includes steps S110 and S112. In step S110, after the first device 31 is associated with the user account, the first security configuration parameter of the first device 31 is stored in the server 2. In step S112, after the second device 32 is associated with the user account, the second security configuration parameter of the second device 32 is stored in the server 2. In practice, the first security configuration parameter and the second security configuration parameter can be stored in the memory 200. According to the said practice, the security configuration parameters of multiple devices can be pre-stored in the server 2, and whenever an additional device is added to the system, the server 2 can fetch a corresponding security configuration parameter pre-stored in the memory 200 and then transmit it to the newly added device.

Figure 5:
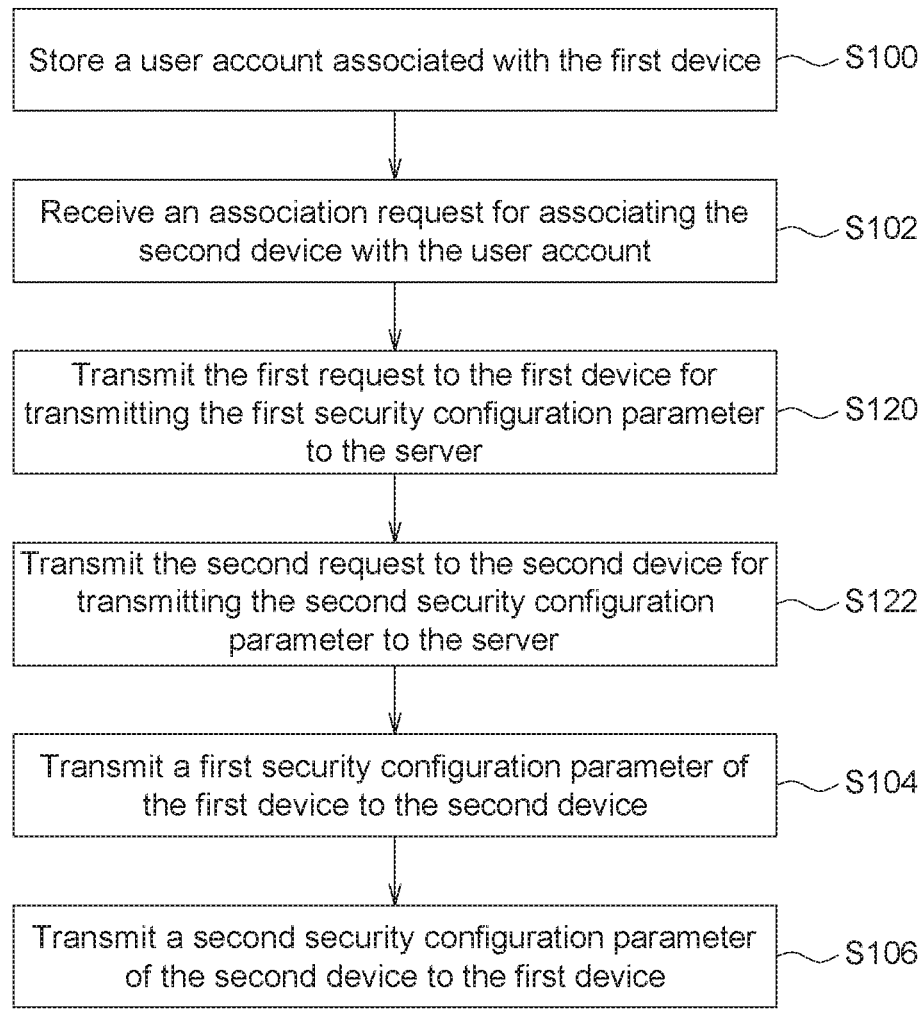
FIG. 5 is a flowchart of an automatic pairing method using a request to transmit security configuration parameters according to an embodiment of the invention.

In another embodiment, the server 2 requests for the first security configuration parameter and the second security configuration parameter from the first device 31 and the second device 32 respectively when the server 2 needs to transmit the first security configuration parameter and the second security configuration parameter. FIG. 5 is a flowchart of an automatic pairing method using a request to transmit security configuration parameters according to an embodiment of the invention. In comparison to the method as indicated in the flowchart of FIG. 1, the automatic pairing method of the present embodiment further includes steps S120 and S122. In step S120, the first request is transmitted to the first device 31 for transmitting the first security configuration parameter to the server 2. In step S122, the second request is transmitted to the second device 32 for transmitting the second security configuration parameter to the server 2. In comparison to the embodiment as indicated in FIG. 4, the server 2 needs a smaller storage space, and sends a request to a corresponding device only when the device's security configuration parameter is needed.

According to the automatic pairing method and the server disclosed in multiple embodiments, multiple devices can be automatically paired. The user does not need to pair individual devices together manually, and therefore the installation procedure can be simplified and the user's time can be saved. Moreover, the devices can operate collaboratively without using the server as an intermediary, and can maintain normal interaction and communication even when the Internet is unavailable. The automatic pairing method of the invention makes it easier to add an additional device to the smart home system, and allows additional devices to be added to the smart home system one after another. The user does not need to procure the complete set of devices of the smart home system all at once. Therefore, the smart home system can have expandability.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An automatic pairing method performed by a server for automatically pairing a first device with a second device, wherein the automatic pairing method comprises:
  receiving a first association request from a wireless communication device for associating the first device with a user account after the first device has been successfully paired with the wireless communication device;
  storing the user account associated with the first device;
  receiving a second association request from the wireless communication device for associating the second device with the user account after the second device has been successfully paired with the wireless communication device, and deciding to pair the first device and the second device together automatically;
  transmitting a first security configuration parameter of the first device to the second device; and
  transmitting a second security configuration parameter of the second device to the first device;
  wherein the server performs the step of receiving the first association request, the step of receiving the second association request, the step of transmitting the first security configuration parameter, and the step of transmitting the second security configuration parameter;

there are three pairing relationships among the first device, the second device and the wireless communication device; and the server, the wireless communication device, the first device and the second device are four different devices.

2. The automatic pairing method according to claim 1, wherein the second association request is outputted after the wireless communication device pairs with the second device.

3. The automatic pairing method according to claim 1, wherein the first security configuration parameter comprises at least one of a device account access parameter, a device public cryptographic key, a communication protocol parameter, and a device automation rule.

4. The automatic pairing method according to claim 1, further comprising:

storing the first security configuration parameter of the first device; and storing the second security configuration parameter of the second device after the second device is associated with the user account.

5. The automatic pairing method according to claim 1, further comprising:

transmitting a first request to the first device for transmitting the first security configuration parameter to the server; and transmitting a second request to the second device for transmitting the second security configuration parameter to the server.

6. A server for automatically pairing a first device with a second device, wherein the server comprises:

a memory used for storing a user account associated with the first device; and a communication circuit electrically coupled to the memory for receiving a first association request and a second association request from a wireless communication device for associating the first device and the second device with the user account after the first device and the second device have been successfully paired with the wireless communication device and deciding to pair the first device and the second device together automatically, wherein the communication circuit is further used for transmitting a first security configuration parameter of the first device to the second device and transmitting a second security configuration parameter of the second device to the first device;

wherein there are three pairing relationships among the first device, the second device and the wireless communication device; and the server, the wireless communication device, the first device and the second device are four different devices.

7. The server according to claim 6, wherein the second association request is outputted after the wireless communication device pairs with the second device.

8. The server according to claim 6, wherein the first security configuration parameter comprises at least one of a device account access parameter, a device public cryptographic key, a communication protocol parameter, and a device automation rule.

9. The server according to claim 6, wherein the memory is further used for storing the first security configuration parameter of the first device, and storing the second security configuration parameter of the second device after the second device is associated with the user account.

10. The server according to claim 6, wherein the communication circuit is further for transmitting a first request to the first device for transmitting the first security configuration parameter to the server, and the communication circuit is further used for transmitting a second request to the second device for transmitting the second security configuration parameter to the server.

11. An automatic pairing method for automatically pairing a first device and a second device, wherein the automatic pairing method comprises:

pairing a wireless communication device with the first device;

transmitting, by the wireless communication device, a first association request to a server for associating the first device with a user account;

pairing the wireless communication device with the second device;

transmitting, by the wireless communication device, a second association request to the server for associating the second device with the user account, and deciding to pair the first device and the second device together automatically;

transmitting, by the server, a first security configuration parameter of the first device to the second device by the server;

transmitting, by the server, a second security configuration parameter of the second device to the first device by the server; and transmitting information of the first device to the second device with and transmitting information of the second device to the first device through the first security configuration parameter and the second security configuration parameter;

wherein the server receives the first association request, receives the second association request, transmits the first security configuration parameter, and transmits the second security configuration parameter;

there are three pairing relationships among the first device, the second device and the wireless communication device; and the server, the wireless communication device, the first device and the second device are four different devices.

* * * * *